United States Patent
Bharadwaj et al.

(10) Patent No.: US 11,108,530 B2
(45) Date of Patent: Aug. 31, 2021

(54) INDICATION OF SLOT AGGREGATION THROUGH DMRS CYCLIC SHIFTS

(71) Applicant: QUALCOMM Incorporated, San Diego, CA (US)

(72) Inventors: Arjun Bharadwaj, Poway, CA (US); Sudhir Kumar Baghel, Hillsborough, NJ (US); Kapil Gulati, Hillsborough, NJ (US); Shailesh Patil, San Diego, CA (US); Shuanshuan Wu, San Diego, CA (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 16/568,108

(22) Filed: Sep. 11, 2019

(65) Prior Publication Data
US 2020/0106590 A1    Apr. 2, 2020

Related U.S. Application Data

(60) Provisional application No. 62/739,134, filed on Sep. 28, 2018.

(51) Int. Cl.
*H04L 5/00* (2006.01)
*H04L 27/26* (2006.01)
*H04L 5/10* (2006.01)

(52) U.S. Cl.
CPC ........ *H04L 5/0082* (2013.01); *H04L 5/0051* (2013.01); *H04L 5/10* (2013.01); *H04L 27/2607* (2013.01)

(58) Field of Classification Search
CPC ....... H04L 5/0082; H04L 5/0051; H04L 5/10; H04L 27/2607
(Continued)

(56) References Cited

U.S. PATENT DOCUMENTS

2018/0103468 A1    4/2018 Li et al.
2018/0146439 A1*   5/2018 Kim ................... H04W 52/322
(Continued)

FOREIGN PATENT DOCUMENTS

WO    2016022924 A1    2/2016
WO    2018217397 A1   11/2018

OTHER PUBLICATIONS

Interdigital Inc: "Details on PRG Size Determination", 3GPP Draft; R1-1720626 Details on PRG Size Determination, 3rd Generation Partnership Project (3GPP), Mobile Competence Centre, 650, Route Des Lucioles ; F-06921 Sophia-Antipolis Cedex ; France, vol. RAN WG1. No. Reno. Nevada. US; Nov. 18, 2017 (Nov. 18, 2017), XP051370092, 4 Pages, Retrieved from the Internet: URL:http://www.3gpp.org/ftp/tsg%5Fran/WG1%5FRL1/TSGR1%5F91/Docs/ [retrieved on Nov. 18, 2017], Section 3.
(Continued)

*Primary Examiner* — Obaidul Huq
(74) *Attorney, Agent, or Firm* — Procopio, Cory, Hargreaves & Savitch LLP

(57) ABSTRACT

The present disclosure relates to methods and devices for communication which may include a transmitting device and at least one receiving device. In one aspect, the transmitting device may determine a transmission configuration including one or more aggregated transmission intervals for communicating with the receiving device. The transmitting device may also indicate the transmission configuration to the receiving device. Additionally, the transmitting device can transmit at least one data packet to the receiving device based on the transmission configuration. Further, the transmission configuration can indicate a number of the one or more aggregated transmission intervals. In some aspects, the receiving device can determine a number of aggregated transmission intervals based on the indication. The receiving
(Continued)

device can also decode the data packet based on the number of aggregated transmission intervals.

28 Claims, 15 Drawing Sheets

(58) Field of Classification Search
USPC .......................................... 370/310, 328, 329
See application file for complete search history.

(56) References Cited

U.S. PATENT DOCUMENTS

| 2019/0215831 A1* | 7/2019 | Baldemair | ............ H04L 5/0053 |
| 2020/0028630 A1* | 1/2020 | Beale | ...................... H04L 1/188 |
| 2020/0127786 A1* | 4/2020 | Kwak | .................. H04L 5/0026 |

OTHER PUBLICATIONS

International Search Report and Written Opinion—PCT/US2019/050834—ISA/EPO—dated Nov. 26, 2019.
Samsung: "Slot Aggregation", 3GPP Draft; R1-1702992 NR Slot Aggregation, 3rd Generation Partnership Project (3GPP), Mobile Competence Centre, 650, Route Des Lucioles ; F-06921 Sophia-Antipolis Cedex ; France, vol. RAN WG1, No. Spokane, USA; Jan. 16, 2017-Jan. 20, 2017, Feb. 12, 2017 (Feb. 12, 2017), XP051210134, 3 Pages, Retrieved from the Internet: URL:http://www.3gpp.org/ftp/Meetings_3GPP_SYNC/RAN1/Docs/ [retrieved on Feb. 12, 2017], Section 2.

\* cited by examiner

INDICATION OF SLOT AGGREGATION THROUGH DMRS CYCLIC SHIFTS

CROSS REFERENCE TO RELATED APPLICATION(S)

This application claims the benefit of U.S. Provisional Application Ser. No. 62/739,134, entitled "INDICATION OF SLOT AGGREGATION THROUGH DMRS CYCLIC SHIFTS" and filed on Sep. 28, 2018, which is expressly incorporated by reference herein in its entirety.

INTRODUCTION

The present disclosure relates generally to communication systems, and more particularly, to methods and systems for vehicle-to-vehicle (V2V), vehicle-to-everything (V2X) communication, and/or Device-to-Device (D2D) communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Some wireless communication may be performed directly between User Equipment (UEs). Examples of such communication include D2D communication, V2X communication, V2V communication, etc. There exists a need for further improvements in wireless communication between UEs. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various features and aspects are described that are related to devices communicating (e.g., by an individual devices or user equipments (UEs) or a group of devices or UEs) in a wireless communication system (e.g., including vehicular systems such as V2X/V2V networks or other D2D communication systems). In V2X communication, a transmitting device may send data as a broadcast or multicast data packets or transport blocks. Devices with data to transmit may communicate with other devices using transmission resources, e.g., spectral resources. A device using transmission resources may transmit data during one or more aggregated slots to at least one receiving device.

In an aspect of the disclosure, a method, a computer-readable medium, and an apparatus are provided. The apparatus can be a transmitting device. In some aspects, the transmitting device may be configured to determine a transmission configuration including one or more aggregated transmission intervals for communicating with at least one receiving device. The transmitting device may also be configured to indicate the transmission configuration to the at least one receiving device. Additionally, the transmitting device may be configured to transmit at least one data packet to the at least one receiving device based on the transmission configuration. Further, the transmission configuration can indicate a number of the one or more aggregated transmission intervals.

In another aspect of the disclosure, a method, a computer-readable medium, and an apparatus are provided. The apparatus can be a receiving device. In some aspects, the receiving device can be configured to receive an indication of a transmission configuration including one or more aggregated transmission intervals from a transmitting device. The receiving device can also be configured to receive at least one data packet from the transmitting device based on the transmission configuration. Additionally, the receiving device can be configured to determine a number of aggregated transmission intervals in the one or more aggregated transmission intervals based on the indication. The receiving device can also be configured to decode the at least one data packet based on the number of aggregated transmission intervals.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
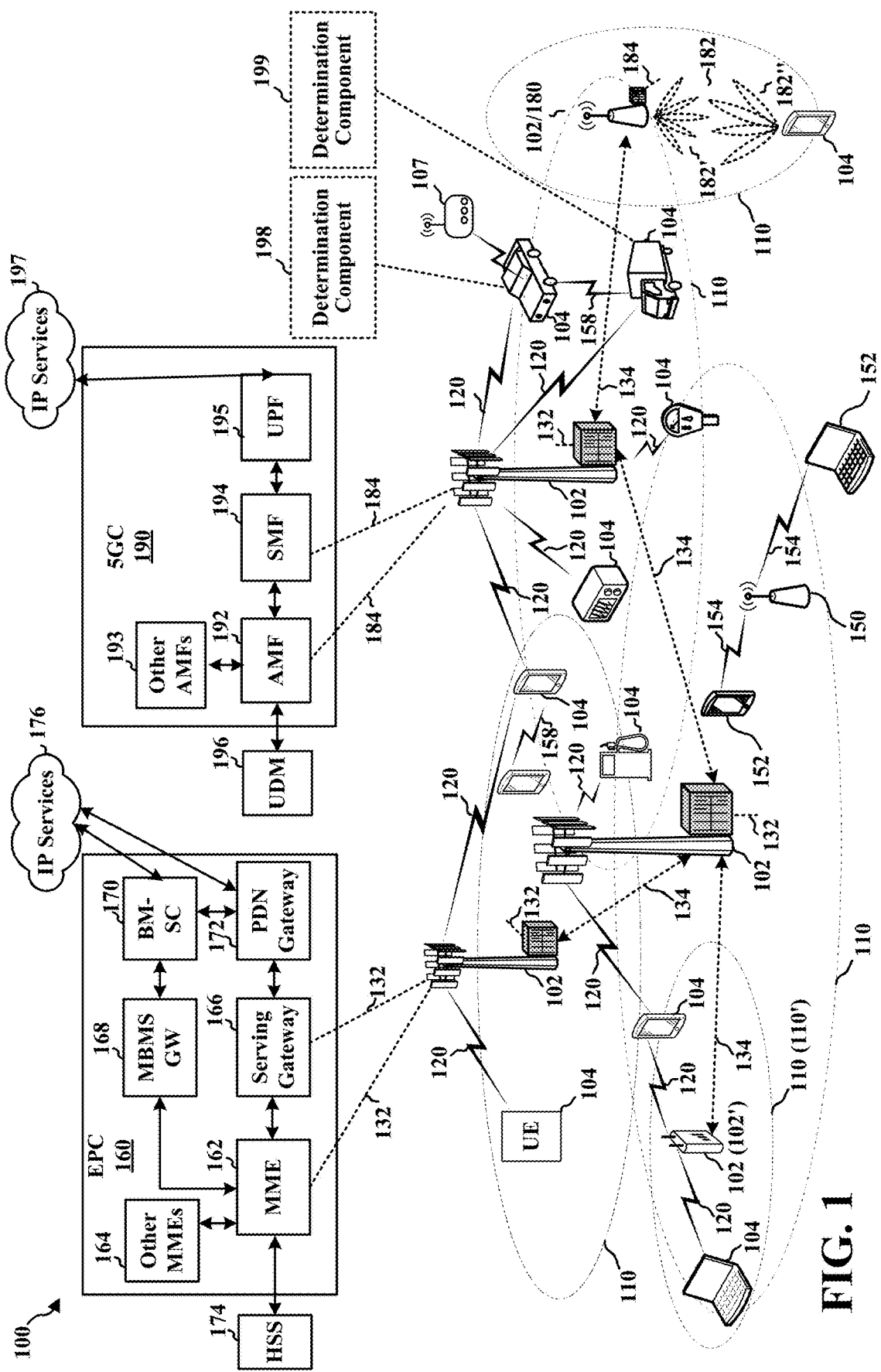
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range.

The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or D2D may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

Referring again to FIG. 1, in certain aspects, the UE 104 may comprise a determination component 198 configured to determine a transmission configuration including one or more aggregated transmission intervals for communicating with at least one receiving device. Determination component 198 can also be configured to indicate the transmission configuration to the at least one receiving device. Moreover, determination component 198 can be configured to transmit at least one data packet to the at least one receiving device based on the transmission configuration.

Additionally, UE 104 may comprise a determination component 199 configured to receive an indication of a transmission configuration including one or more aggregated transmission intervals from a transmitting device. Determination component 199 can also be configured to receive at least one data packet from the transmitting device based on the transmission configuration. Determination component 199 can also be configured to determine a number of aggregated transmission intervals in the one or more aggregated transmission intervals based on the indication. Further, determination component 199 can be configured to decode the at least one data packet based on the number of aggregated transmission intervals.

Figure 2:
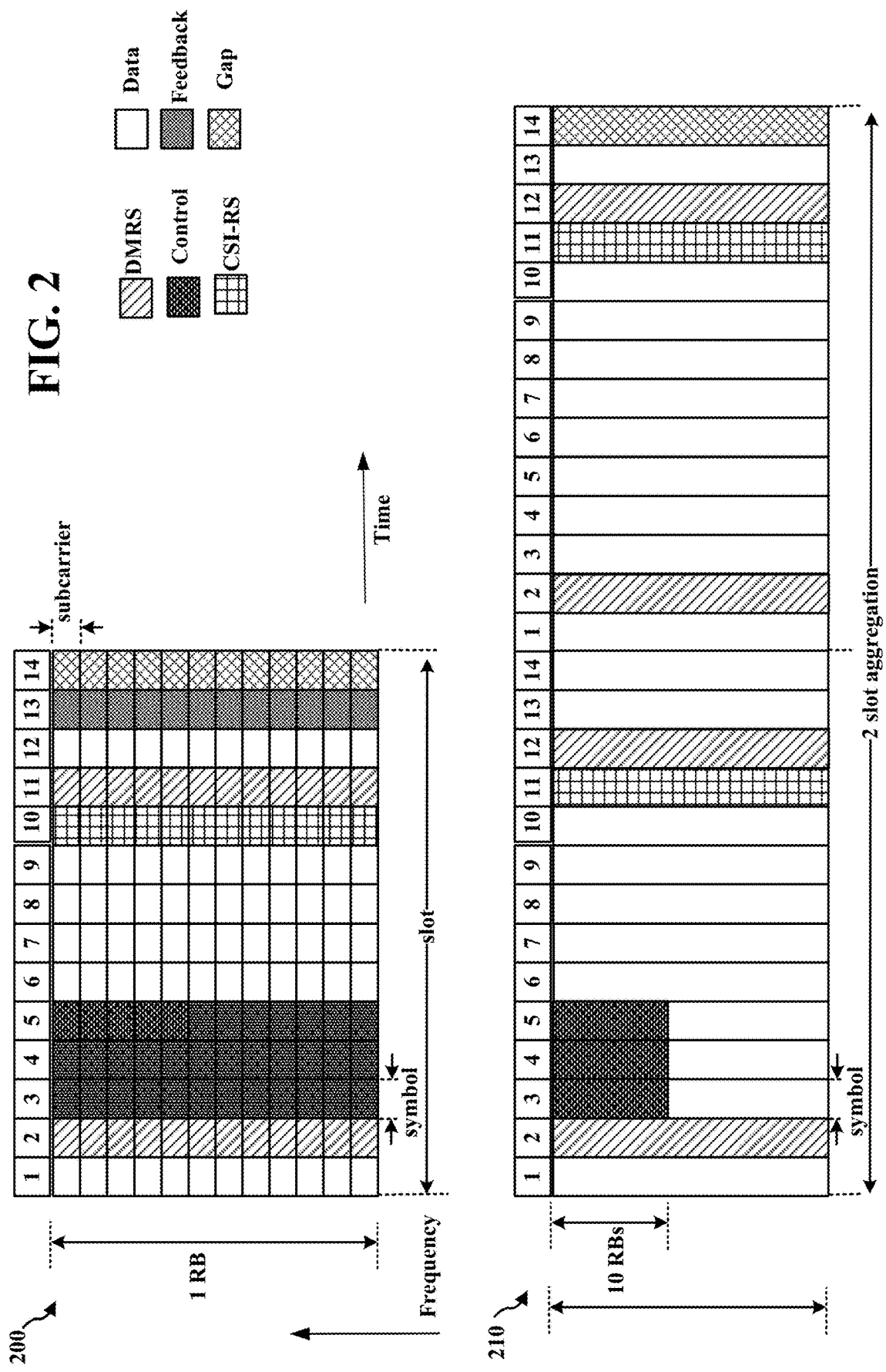
FIG. 2 illustrates example aspects of a sidelink slot structure.

FIG. 2 illustrates example diagrams 200 and 210 illustrating examples slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates an example two-slot aggregation, e.g., an aggregation of two 0.5 ms TTIs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DMRS). FIG. 2 also illustrates that symbol(s) may comprise CSI-RS. The symbols in FIG. 2 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic, e.g., based on downlink control information (DCI) triggering. For time/frequency tracking, CSI-RS may be either periodic or aperiodic. CSI-RS may be transmitted in busts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 3:
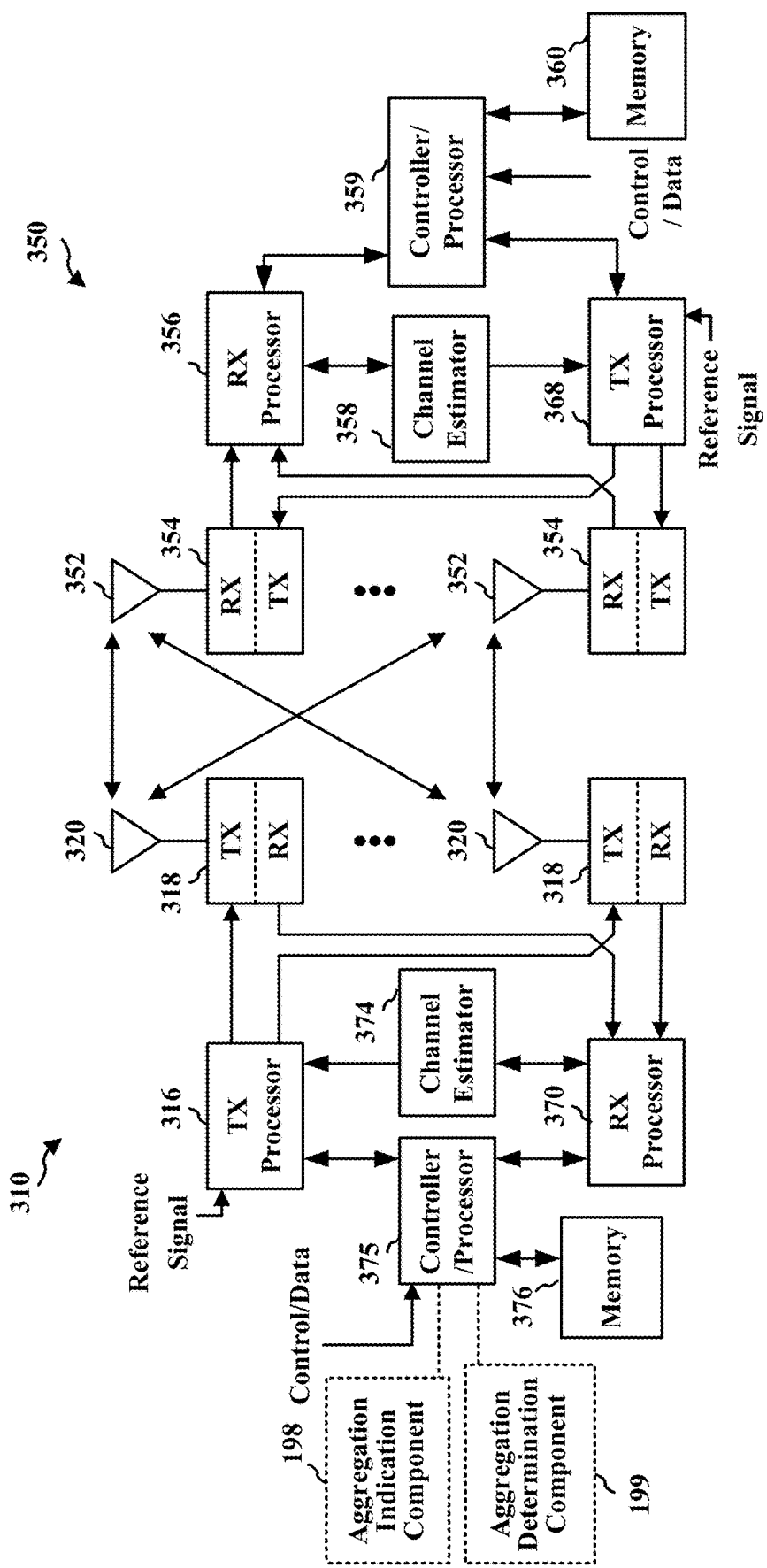
FIG. 3 is a diagram illustrating an example of a devices in an access network.

FIG. 3 is a block diagram 300 of a first wireless communication device 310 in communication with a second wireless communication device 350, e.g., via V2V/V2X/D2D communication. The device 310 may comprise a transmitting device communicating with a receiving device, e.g., device 350, via V2V/V2X/D2D communication. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with 198 of FIG. 1.

At least one of the TX processor 368, the RX processor 356, or the controller/processor 359 of device 350 or the TX 316, the RX processor 370, or the controller/processor 375 may be configured to perform aspects described in connection with 199 of FIG. 1.

Figure 4:
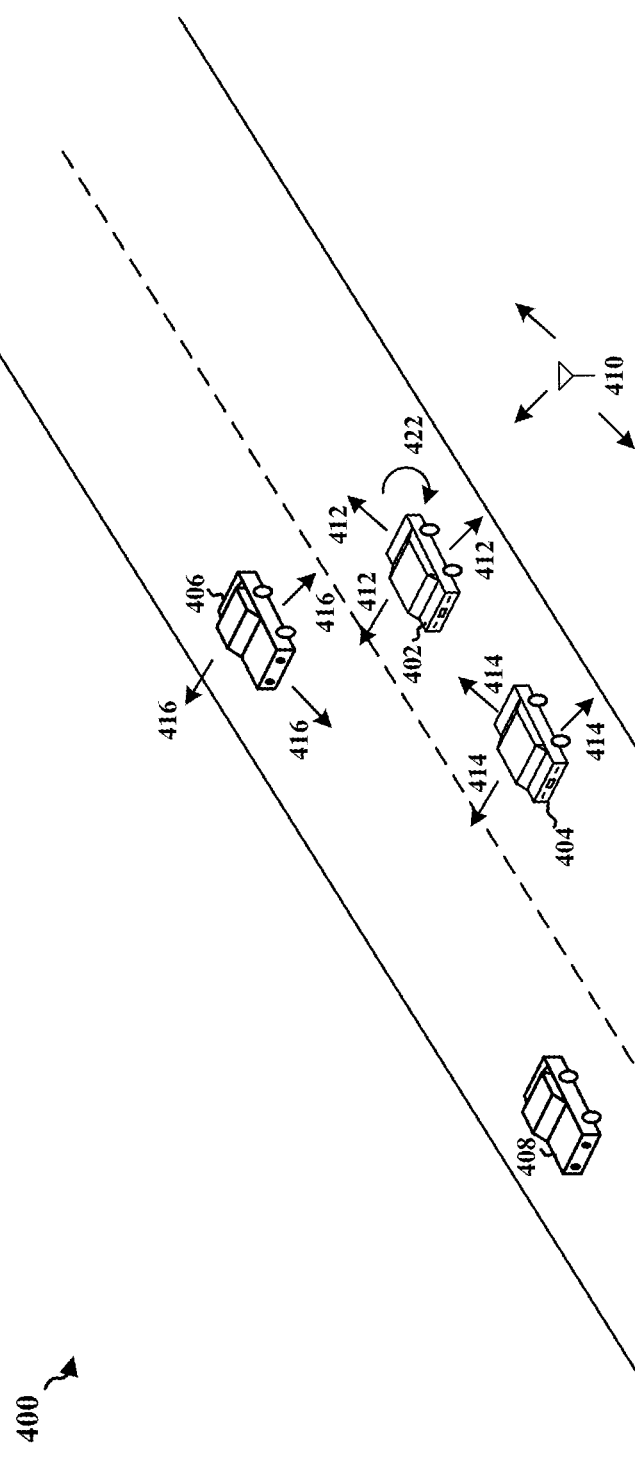
FIG. 4 illustrates an example of communication between devices.

FIG. 4 is a drawing 400 illustrating an example of communications between devices. In the illustrated example, a plurality of devices including devices 402, 404, 406, 408, and 410 are shown. As shown in FIG. 4, the devices can be vehicles (e.g., devices 402, 404, 406, 408), roadside units (e.g., device 410), UEs, or UEs traveling with a vehicle. As further illustrated in FIG. 4, some devices may be traveling in the opposite direction relative to each other, e.g., devices 402 and 406, while others may be moving in the same direction relative to each other, e.g., devices 402 and 404 or devices 406 and 408. In the illustrated example, device 402 may be transmitting (e.g., broadcasting) a message 412 and may be monitoring for messages from other devices. Device 404 may also be transmitting a message 414 and may be monitoring for messages from other devices. Additionally, device 406 may be transmitting a message 416 and may be monitoring for messages from other devices. While not explicitly shown, the other devices may also be transmitting messages and monitoring for other messages. Devices may also make determinations based on a number of factors, such as other messages or QoS levels.

As further shown in FIG. 4, devices 402, 404, 406, or 410 may communicate directly with each other. The communication may comprise V2X, V2V, and/or D2D communication. The device may comprise vehicles, e.g., devices 402, 404, 406, roadside units, e.g., device 410, UEs, or UEs in vehicles, etc.

V2X communication may include the transmission and reception of communication directly between devices, e.g., between any of devices 402, 404, 406, or 410, e.g., without a centralized scheduling unit for communications, such as a base station. Thus, communication can be distributed amongst the devices or vehicles. In further aspects of V2X communication, there can be distributed channels in the communication. In some instances, each device or vehicles may attempt to obtain access to each distributed channel and then to transmit data to the surrounding devices or vehicles, e.g., based on aspects of the link design illustrated in FIG. 2.

A link level design for such communication may be designed to support high spectral efficiencies at high communication speeds and high carrier frequencies, e.g., 6 GHz. The Link level design can also allow for fairly large amounts of traffic between devices or vehicles. In further aspects, the link level design according to the present disclosure can allow devices or vehicles to communicate with each other more efficiently and with improved reliability. Device, such as vehicles, may need to utilize the link level design to communicate with low latency. The Link level design can also serve different types of applications, e.g., location information, or other communication information. Some examples of link level design can include a communications with a high Doppler due to the corresponding speed and carrier frequency, e.g., 2800 Hz at 500 kmphr relative or 6 GHz. Additionally, link level design can include a high carrier frequency offset (CFO) due to a high carrier frequency.

The link level design according to the present disclosure can be applied in a dynamic environment. For instance, there may be no persistent reference signals transmitted during communication. Also, feedback from receiving devices may not be reliable given low periodicity of transmissions, e.g., 10 Hz. The highly mobile nature of devices, such as vehicles and other UEs, that may be involved in V2X communication leads to challenges. Some aspects of link design according to the present disclosure can include support high spectral efficiency even at high speeds. Further, aspects of link level design can have MIMO support, such as having transmit diversity for broadcast messages and/or spatial multiplexing for unicast.

Link level design according to the present disclosure may include a TTI transmission time interval (TTI) structure in which packets are transmitted or received in transmission intervals of time. Such intervals may comprise one or more slots, one or more mini-slots, or other sizes of intervals. In these aspects of the present disclosure, an OFDM waveform with varying de-modulation reference signal (DMRS) density can support different speeds and throughput. For instance, OFDM waveform structures according to the present disclosure can include a control channel followed by data channel and a feedback channel. In some aspects, this can be the structure used for communication between devices, e.g., in V2X. Aspects may also be applied to other communication such as V2V or D2D communication. In some aspects, the amount of data that needs to be transmitted may be different for each device or vehicle and may vary at different times. Accordingly, packet size can vary among different devices and even for the same vehicle at different times.

Some aspects of the present disclosure can maintain the same coverage areas, i.e., link budget, through slot aggregation. Indeed, the link budget can be maintained for each device or vehicle through the use of slot aggregation. Aspects of the present disclosure can maintain the same link budget no matter the size or type of packet that is being transmitted. Slot aggregation can allow the present disclosure to keep the same link budget or coverage areas for all different types of traffic. In some aspects, the link budget can be maintained because the transmit power can be maintained, e.g., by using the same number of tones and/or frequency. Further, the transmit power can be spread across the same number of tones.

Figure 5:
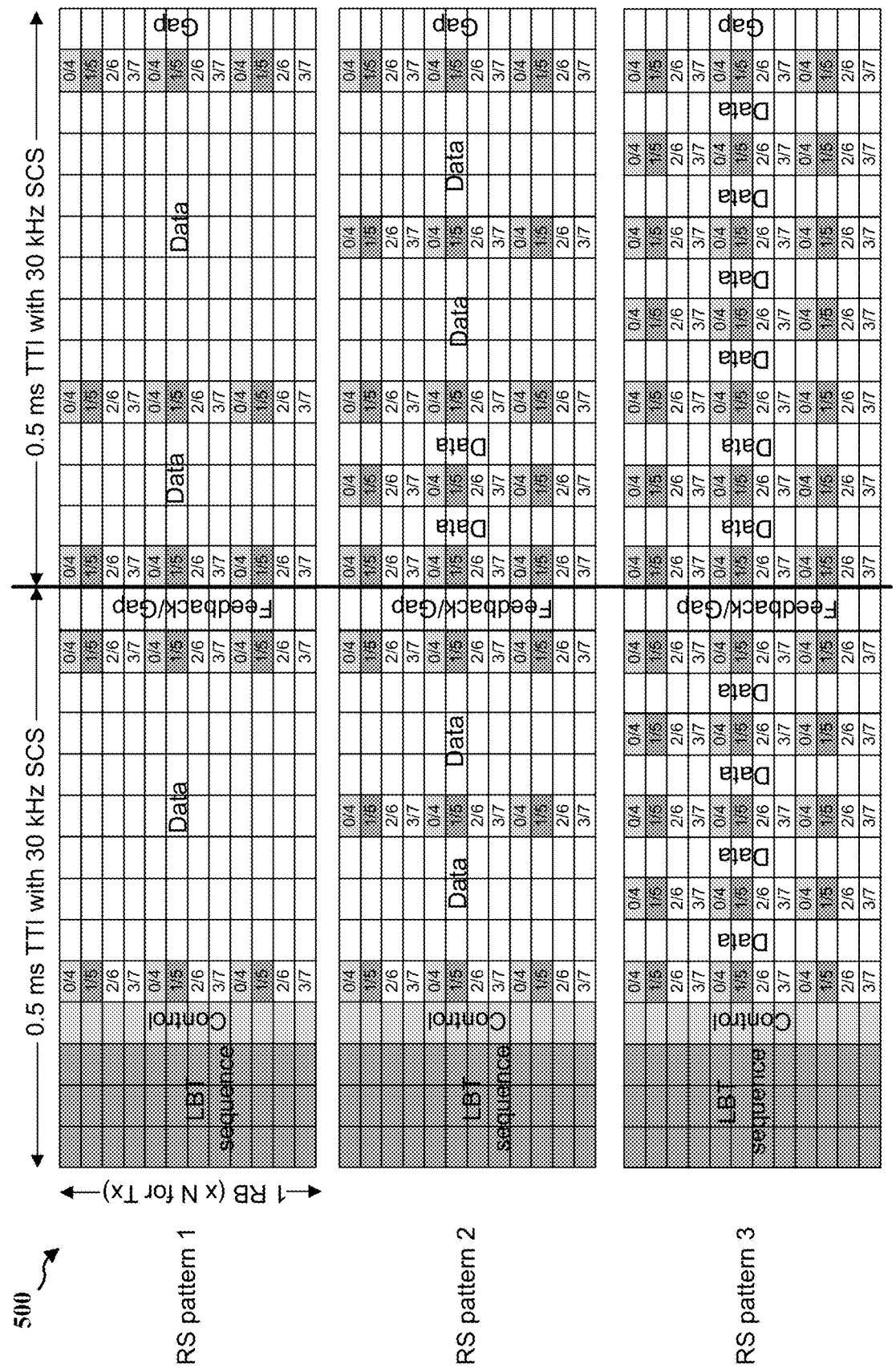
FIG. 5 illustrates an example of resource allocation in communication between devices.

FIG. 5 illustrates another example 500 of communication between devices. More specifically, FIG. displays one aspects of a TTI bundled transmission or slot aggregation. As mentioned supra, TTI bundling or slot aggregation can be used for an improved link budget and/or reduced overhead. As shown in FIG. 5, the base design can include, e.g., 30 kHz sub-carrier spacing (SCS) and 0.5 ms TTI. In some aspects, the communication interference may change every TTI. Based on this, the reference signal (RS) pattern may be chosen accordingly. Further, as shown in FIG. 5, the transmission can be spread across two slots or TTI. The transmit power can also be spread across a certain fixed number of frequency tones. As mentioned above, the link budget can be maintained by ensuring that the number of tones and frequency is the same for different data packet sizes. Also, in some aspects the link budget may be proportional to the transmit power, and the same amount of transmit power per ton can be used for all the packet sizes.

FIG. 5 also illustrates three different RS patterns, e.g., RS pattern 1, RS pattern 2, and RS pattern 3. In order to demodulate the reference signals, the present disclosure can utilize a control channel, e.g., through an LBT sequence. In some aspects, the control channel can indicate the number of TTI bundles and the RS pattern. Also, the control channel can indicate the transparent mode (TM), the modulation and coding scheme (MCS), the number of ports, and/or the number of layers for data. Aspects of the present disclosure can also include a channel state information RS (CSI-RS) configuration or a feedback mode. As shown in FIG. 5, the present disclosure can also use a data channel for DMRS, which can include up to eight antenna ports for support. RS pattern 1 includes a transmission of RS in a fifth symbol of the TTI, following a control symbol. Another RS is transmitted in the 13$^{th}$ symbol of the TTI, just prior to feedback/gap symbol. As the LBT sequence can be performed in the first TTI, in the second TTI, the RS is transmitted in a first, fourth, and 13$^{th}$ symbol. RS pattern 2 involves additional symbols used for RS transmission compared to RS pattern 1. RS pattern 3 involves a pattern that alternates data symbols with RS symbols.

Aspects of the present disclosure can also indicate the amount of total overhead. For instance, as in FIG. 5, the total overhead can vary depending on the number of ports used. For example, one port can use the data channel, while multiple ports can be considered slot aggregation or TTI. For RS patterns 1, 2, and 3 shown in FIG. 5, using one port can result in 25%, 28%, and 32% overhead, respectively. Also, for RS patterns 1, 2, and 3, two ports can result in 30%, 35%, and 42% overhead, respectively. In some aspects, the improved overhead can be due to varying RS density, e.g., based on speed and MCS, and/or TTI bundling.

As discussed supra, the present disclosure can maintain the same link budget or coverage area for different packet sizes by aggregating the number of slots. For example, for small packet sizes, the present disclosure can utilize a single slot. For larger packet sizes, the present disclosure can increase the number of slots used to transmit through slot aggregation. By doing so, the present disclosure can also maintain the same frequency and link budget. Accordingly, all packet sizes transmitted according to the present disclosure can use the same link budget. Indeed, the present disclosure can maintain the same frequency allocation and increase the number of slots in order to maintain the same link budget for increasing packet sizes. For example, different numbers of slots are used for different packet sizes.

Figure 7:
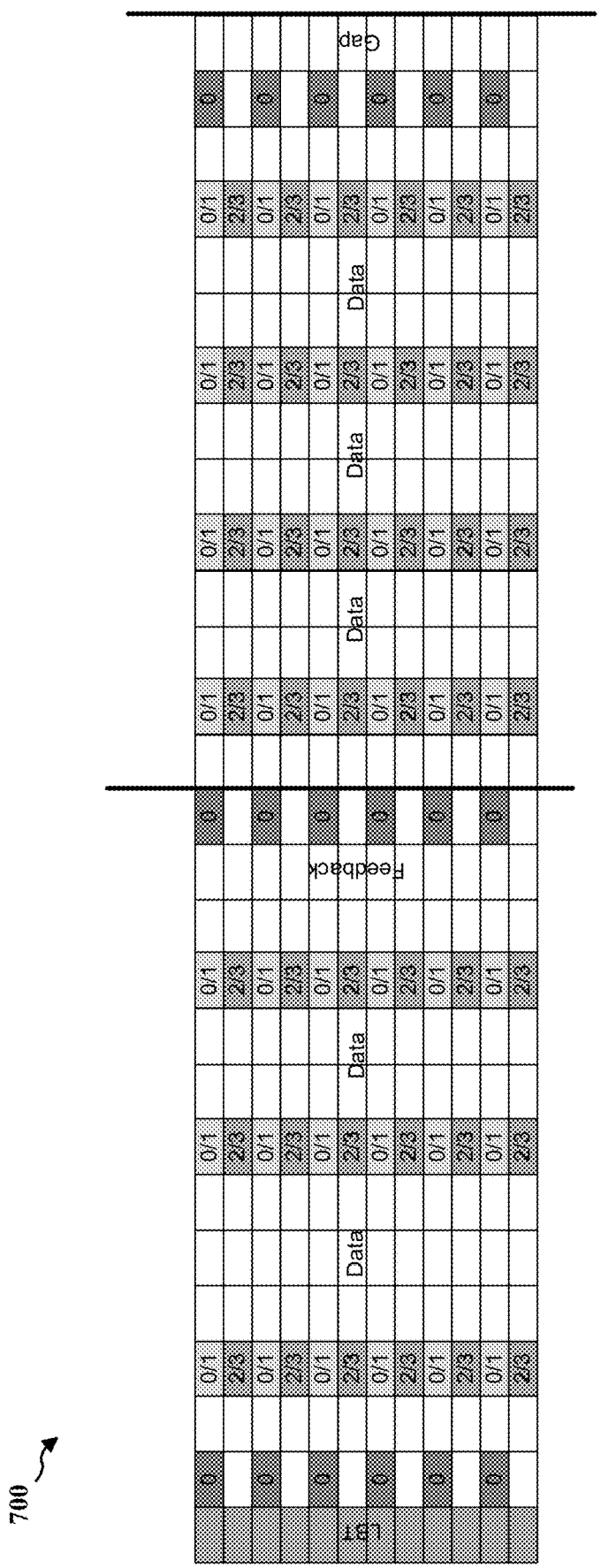
FIG. 7 illustrates another example of resource allocation in communication between devices.

In some aspects, the transmitting device can communicate the number of slots that have been aggregated to the receiving device. In one example, the transmitting device can accomplish this through using a DMRS sequence, which comprises reference signals used for channel estimation. Also, the present disclosure can maintain similar code rates for different numbers of slots. For example, the receiving device may decode communication from a transmitting device by determining the number of slots and determining which slots have been aggregated. Additionally, in some aspects of slot aggregation according to the present disclosure, the number and/or density of the DMRS sequences can change. For example, as shown in FIG. 7 discussed below, there are three DMRS sequences in the first slot, and 4 DMRS sequences in the second slot. In some aspects, for low transmission speeds and/or low MCS, there may be a smaller number of DMRS sequences. As the MCS is increase, e.g., from 16 QAM to 64 QAM to 256 QAM, the density and number of DMRS symbols can also increase. Accordingly, in some aspects, there can be more DMRS sequences if the MCS is higher. The present disclosure can include any number of DMRS sequences per slot.

Figure 6:
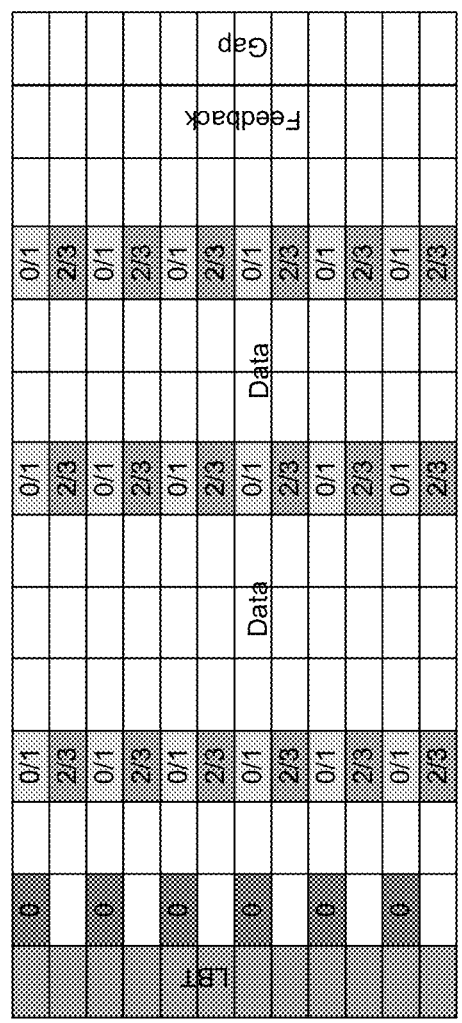
FIG. 6 illustrates another example of resource allocation in communication between devices.

FIGS. 6 and 7 illustrate examples 600 and 700, respectively, of resource allocation in communication between devices. More specifically, FIGS. 6 and 7 display DMRS design and slot aggregation according to the present disclosure. FIG. 6 illustrates a transmission of a single slot, which utilizes three DMRS sequences. FIG. 7 illustrates a transmission by aggregating two slots together, which includes a total of seven DMRS sequences. In some aspects, the present disclosure can indicate the number of slots being aggregated. For instance, the transmitting device can indicate the aggregation number to the receiving device. As mentioned above, the transmitting device can indicate the aggregation number to the receiving device, so the receiving device can decode the transmitted data packet. For the example in FIG. 6, the transmitting device can indicate one slot. For the example in FIG. 7, the transmitting device can indicate two slots.

As mentioned previously, the DMRS density can increase with the MCS and/or the Doppler. Accordingly, there can be more DMRS sequences if the MCS is higher. In addition, DMRS cyclic shifts can be used to indicate the slot aggregation amount. In one aspect, the present disclosure can use formulas to indicate the slot aggregation. For example, the following formula can be used:

$$r(m) = \frac{1}{\sqrt{2}}(1 - 2 \cdot c(2m)) + j\frac{1}{\sqrt{2}}(1 - 2 \cdot c(2m+1))$$

$$m = 0, 1, \ldots$$

In the above formula, r(m) can be the sequence used for the DMRS. Also, m can be an increasing number, c can refer to a pseudo random Gold sequence, and j can refer to an imaginary number. In some aspects, r(m) can used to encode the transmitted DMRS sequence. For instance, the DMRS sequence can be mapped to the resource elements using the r(m) formula above. The DMRS sequence can also be mapped to different subcarriers and different symbols.

As mentioned supra, the present disclosure can utilize both cyclic shifts and DMRS sequences. The cyclic shift value can correspond to the number of slots that have been aggregated. In some instances, up to a certain number, e.g., m, slots can be aggregated. For each number of slots that are aggregated, there may be a different value of the cyclic shift that is used to encode the DMRS sequence. In some aspects, the DMRS sequence can pertain to either data channel or control channel transmissions. As mentioned above, the receiving device can detect the cyclic shift value used by detecting the amount of energy in the cyclic shift. In some aspects, cyclic shifts can be defined by the formula: $r^{\alpha}(n) = e^{j\omega r}\bar{r}(n)$, wherein $\alpha$ or alpha is the cyclic shift value. For instance, which the receiving device can detect the cyclic shift value used by detecting the amount of energy in alpha. Also, the present disclosure can produce these updated cyclic shifts and DMRS sequences for new data packet transmission, which can then be used and mapped to each of the corresponding resources.

Aspects of the present disclosure can include an aggregation of any number of slots. Thus, transmissions may be based either on a single slot or an aggregation of multiple slots, e.g., up to eight slots. For each value, a distinct value of $\alpha$ can be used to represent the amount of aggregated slots. In some aspects, the exact value of $\alpha$ may depend on the length of the DMRS sequence. For example, if the length of the DMRS sequence is S, then each value of $\alpha$ can be separated by S/8 to ensure maximum separation between cyclic shifts. This can be done to ensure that the each value of $\alpha$ is unique for each different aggregated slot number.

In some aspects, the transmitting device can indicate the number of slots through the cyclic shift in the DMRS sequence. For example, if five slots are being aggregated, then the cyclic shift value or alpha will correspond to five slots. The receiving device can detect the energy in the cyclic shift value or alpha, and note that five slots have been aggregated because the fifth slot value may have the highest amount of energy. Further, in some aspects, the cyclic shift value can be used in each of the slots, but the receiving device can note that the energy is highest at the fifth slot. After doing so, the receiving device can use the cyclic shift value to decode the transmitted packet. As noted above, there can be up to m slots being aggregated, wherein m is a constant number. Also, the cyclic shift value may depend on the length of the DMRS sequence.

Aspects of the present disclosure can also use unique values of alpha for each slot aggregation value. As mentioned supra, the present disclosure can ensure that the cyclic shift value or alpha is separated as much as possible during the length of the DMRS sequence. In one aspects, as mentioned above, the receiving device can decode the slot aggregation value by detecting the energy values for different cyclic shift values or alphas. Once the receiving device determines and/or decodes the value of alpha, e.g., 1-8 or 1-16, then the receiving device can use that value to decode the number of slots. As noted above, m can be used to indicate the number of slots. Additionally, the DMRS structure may be repeated for a higher number of slots. As such, cyclic shifting according to the present disclosure can indicate the number of slots that have been aggregated.

The present disclosure can also use different aspects to signal slot aggregation. For instance, some aspects can signal slots aggregation as part of the control channel. Accordingly, the transmitting device can use the control channel to indicate the number of slots being aggregated to the receiving device. As such, slot aggregation can be indicated in either the control channel or through the cyclic shift in DMRS sequences. In some aspects, if there is no space in the control channel, the present disclosure can indicate the cyclic shift in the DMRS sequence transmitted as part of the control channel or as part of the data channel or any other DMRS sequence in any other channel. In other aspects, the present disclosure may want to reduce the number of transmitted data or bits in the control channel, so it can indicate the cyclic shift in the DMRS sequence. In some instances, one field in the control channel may be used to indicate the slot aggregation or TTI bundling. Further, the control channel can use different bits or data to indicate that certain amounts of slots are being aggregated. For example, the control channel can use three bits to indicate that up to eight slots are being aggregated. Also, the control channel can use four bits to indicate that up to 16 slots are being aggregated. In addition, the control channel can indicate the slots aggregation or TTI bundling by using other control fields. As such, the present disclosure can communicate or signal the slot aggregation as part of the control channel or cyclic shift of the DMRS sequence.

Figure 8:
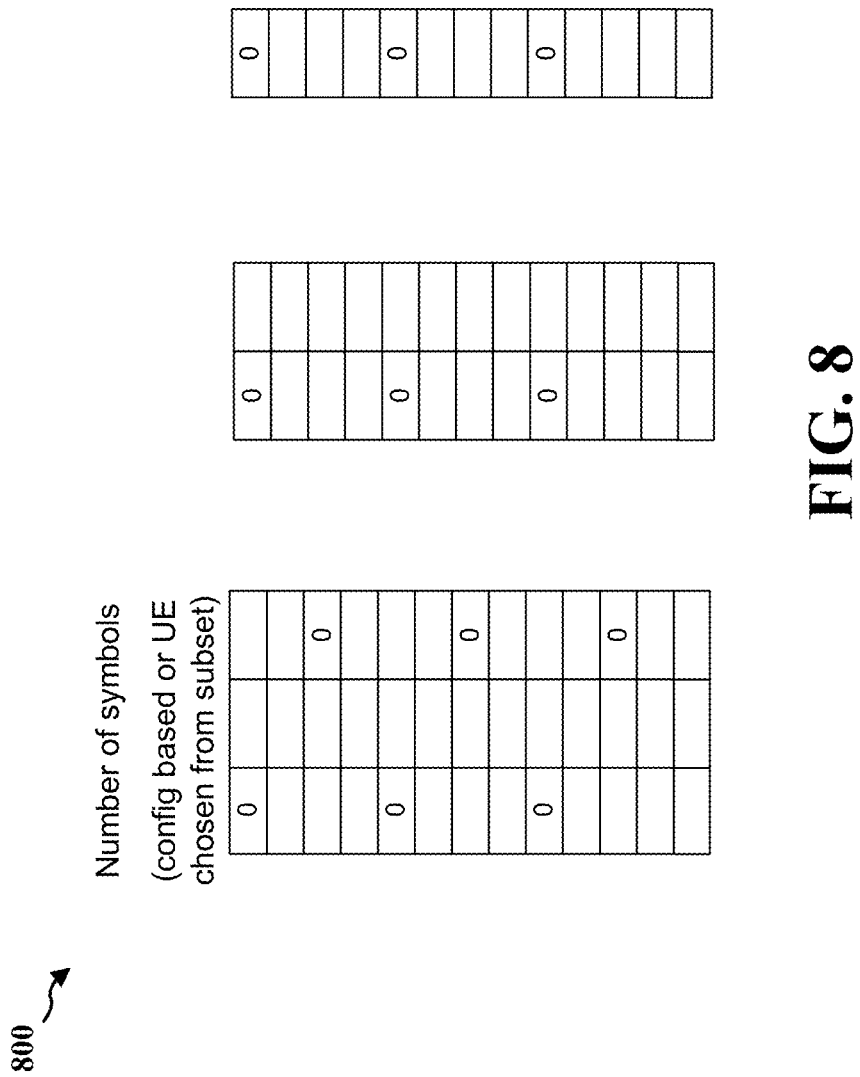
FIG. 8 illustrates another example of resource allocation in communication between devices.

FIG. 8 illustrates another example 800 of resource allocation in communication between devices. FIG. 8 shows a control channel DMRS design. For example, the DMRS location may depend on a number of control channel symbols. Additionally, as mentioned above, the DMRS cyclic shifts can be used to indicate the slot aggregation value. As further mentioned supra, either the control channel or the data channel DMRS sequence can be used to indicate the slot aggregation value.

Figure 9:
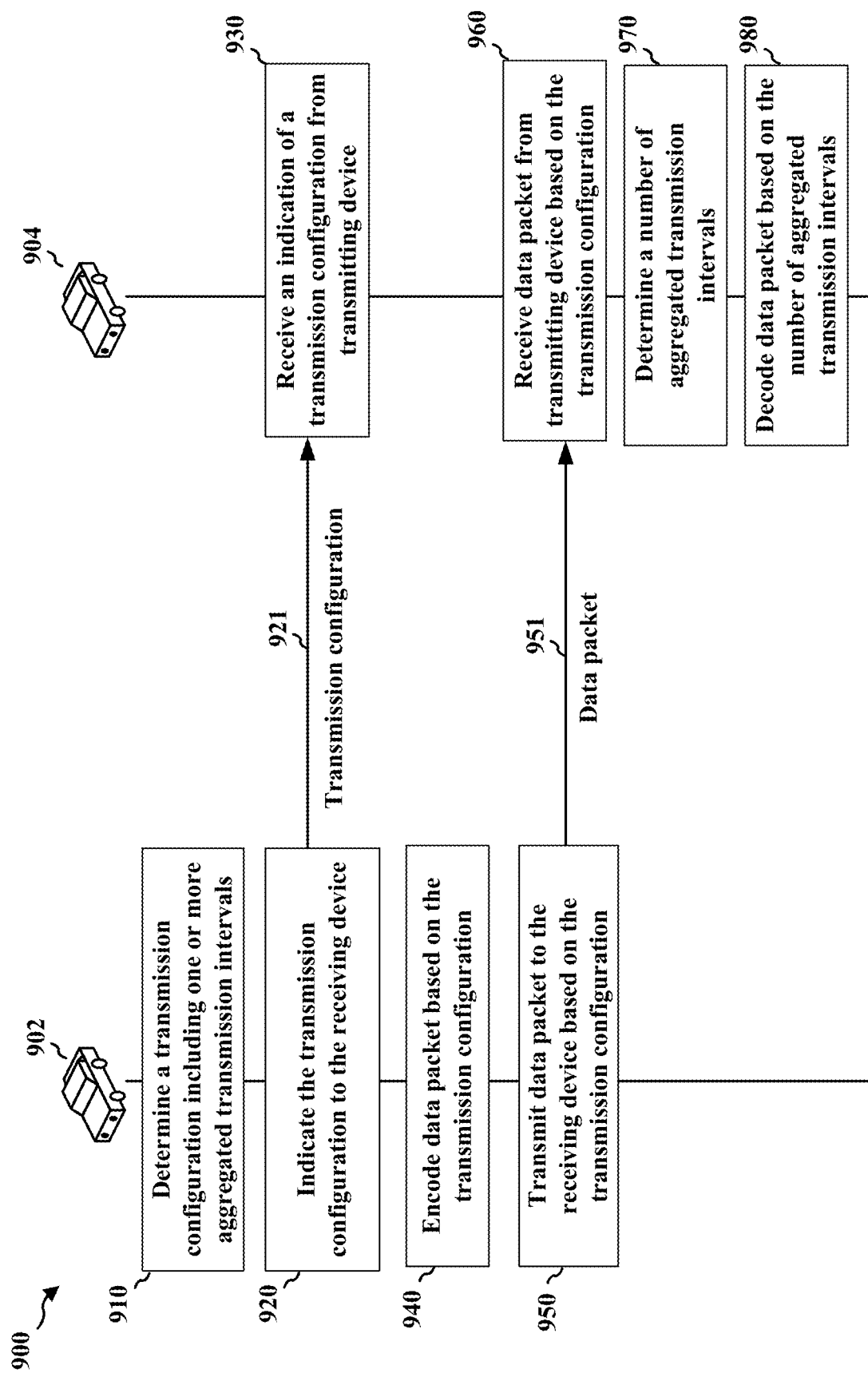
FIG. 9 is a diagram illustrating transmissions between devices.

FIG. 9 is a diagram 900 illustrating transmissions between a transmitting device, e.g., device 902, and a receiving device, e.g., device 904. The devices may be engaged in V2X communication for example. Aspects may also be applied to V2V communication or to D2D communication between devices. Although illustrated as vehicles, devices 902, 904, aspects may be applied to a UE, an RSU, and/or a base station engaged in V2X, V2V, or D2D communication. For instance, at 910, the device 902 can determine a transmission configuration including one or more aggregated transmission intervals for communicating with at least one receiving device, as described in connection with the examples in FIGS. 6 and 7. The one or more aggregated transmission intervals can comprise one or more aggregated slots or one or more aggregated mini-slots, or any other appropriate interval. In some aspects, when determining the transmission configuration, device 902 can aggregate the one or more aggregated transmission intervals for communicating with the receiving device 904.

At 920, the device 902 can indicate the transmission configuration 921 to the receiving device 904, as described in connection with the examples in FIGS. 6 and 7. Likewise, at 930, the receiving device 904 can receive an indication of a transmission configuration including one or more aggregated transmission intervals from the transmitting device 902. The transmission configuration can indicate a number of the one or more aggregated transmission intervals. In some aspects, the transmission configuration may indicate the number of aggregated transmission intervals using a DMRS sequence, as described in connection with the examples in FIGS. 6 and 7. Additionally, the DMRS sequence can include a cyclic shift, as described in connection with the examples in FIGS. 6 and 7. The cyclic shift can also comprise a cyclic shift value based on a length of the DMRS sequence. Moreover, the cyclic shift value can correspond to the number of aggregated transmission intervals, as described in connection with the examples in FIGS. 6 and 7.

In other aspects, the number of aggregated transmission intervals may be indicated using a control channel, as described in connection with the examples in FIGS. 6 and 7.

At 940, the device 902 can encode at least one data packet based on the transmission configuration, as described in connection with the examples in FIGS. 6 and 7. In some aspects, the at least one data packet can be encoded based on the cyclic shift, as described in connection with the examples in FIGS. 6 and 7. In other aspects, the at least one data packet may be encoded based on the control channel, as also described in connection with the examples in FIGS. 6 and 7. Furthermore, the number of aggregated transmission intervals may be based on a size of the at least one data packet, as described in connection with the examples in FIGS. 6 and 7.

At 950, the transmitting device 902 can transmit the at least one data packet 951 to the receiving device 904 based on the transmission configuration, as described in connection with the examples in FIGS. 6 and 7. Likewise, at 960, the receiving device 904 can receive the at least one data packet 951 from the transmitting device 902 based on the transmission configuration.

At 970, the receiving device 904 can determine a number of aggregated transmission intervals in the one or more aggregated transmission intervals based on the indication, as also described in connection with the examples in FIGS. 6 and 7. The receiving device 904 can determine the number of aggregated transmission intervals based on the cyclic shift.

Additionally, at 980, the receiving device 904 can decode the at least one data packet 951 based on the number of aggregated transmission intervals, as described in connection with the examples in FIGS. 6 and 7. Moreover, the at least one data packet can be decoded based on the cyclic shift. The at least one data packet can also be decoded based on the control channel.

Figure 10:
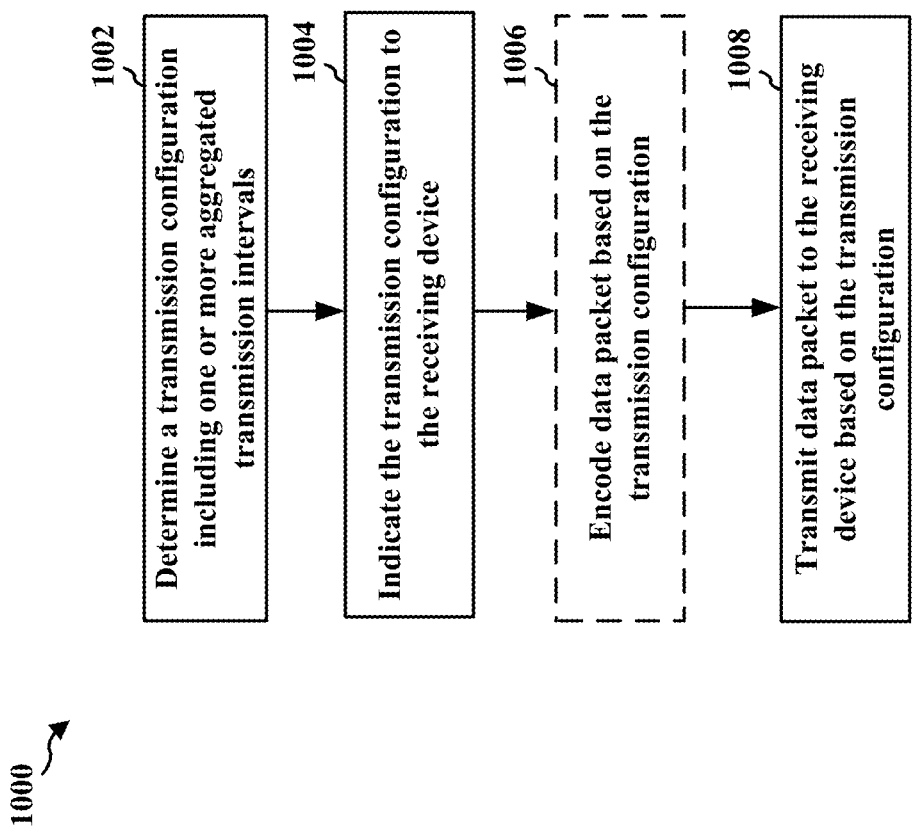
FIG. 10 is a flowchart of a method of wireless communication.

FIG. 10 is a flowchart 1000 of a method of wireless communication. The method may be performed by a device, UE, or a component of a UE (e.g., UE 104, 350, 402, 902, apparatus 1102; processing system 1214, which may include the memory 360 and which may be the entire UE or a component of the UE, such as the TX processor 368, the RX processor 356, and/or the controller/processor 359) communicating with a device or UE (e.g., UEs 104, 404, 406, 408, 410, 904, apparatus 1402). Optional aspects are illustrated with a dashed line. As mentioned in connection with the example of FIG. 4, the device or UE can comprise a vehicle and/or a roadside unit. As further mentioned in connection with FIG. 4, the vehicles and/or a roadside units, e.g., the device or UE, can be engaged in V2X/V2V/D2D communication. The methods described herein can provide a number of benefits, such as improving communication signaling, resource utilization, and/or power savings.

At 1002, the device can determine a transmission configuration including one or more aggregated transmission intervals for communicating with at least one receiving device, as described in connection with the examples in FIGS. 6 and 7. For example, determination component 1106 of apparatus 1102 may determine a transmission configuration including one or more aggregated transmission intervals for communicating with at least one receiving device. The one or more aggregated transmission intervals can comprise one or more aggregated slots or one or more aggregated mini-slots, or any other appropriate interval. In some aspects, when determining the transmission configuration, the device can aggregate the one or more aggregated transmission intervals for communicating with a receiving device.

At 1004, the device can indicate the transmission configuration to the receiving device, as described in connection with the examples in FIGS. 6 and 7. For example, indication component 1108 of apparatus 1102 may indicate the transmission configuration to the receiving device. The transmission configuration can indicate a number of the one or more aggregated transmission intervals. The transmission configuration may indicate the number of aggregated transmission intervals using a DMRS sequence, as described in connection with the examples in FIGS. 6 and 7. In some aspects, the DMRS sequence can include a cyclic shift, as described in connection with the examples in FIGS. 6 and 7. The cyclic shift can also comprise a cyclic shift value based on a length of the DMRS sequence. Further, the cyclic shift value can correspond to the number of aggregated transmission intervals, as described in connection with the examples in FIGS. 6 and 7.

In other aspects, the number of aggregated transmission intervals may be indicated using a control channel, as described in connection with the examples in FIGS. 6 and 7.

At 1006, the device can encode at least one data packet based on the transmission configuration, as described in connection with the examples in FIGS. 6 and 7. For example, encoding component 1110 of apparatus 1102 may encode at least one data packet based on the transmission configuration. In some aspects, the at least one data packet can be encoded based on the cyclic shift, as described in connection with the examples in FIGS. 6 and 7. In other aspects, the at least one data packet may be encoded based on the control channel, as also described in connection with the examples in FIGS. 6 and 7. Moreover, the number of aggregated transmission intervals may be based on a size of the at least one data packet, as described in connection with the examples in FIGS. 6 and 7.

At 1008, the device can transmit the at least one data packet to the receiving device based on the transmission configuration, as described in connection with the examples in FIGS. 6 and 7. For example, transmission component 1112 of apparatus 1102 may transmit the at least one data packet to the receiving device based on the transmission configuration.

Figure 11:
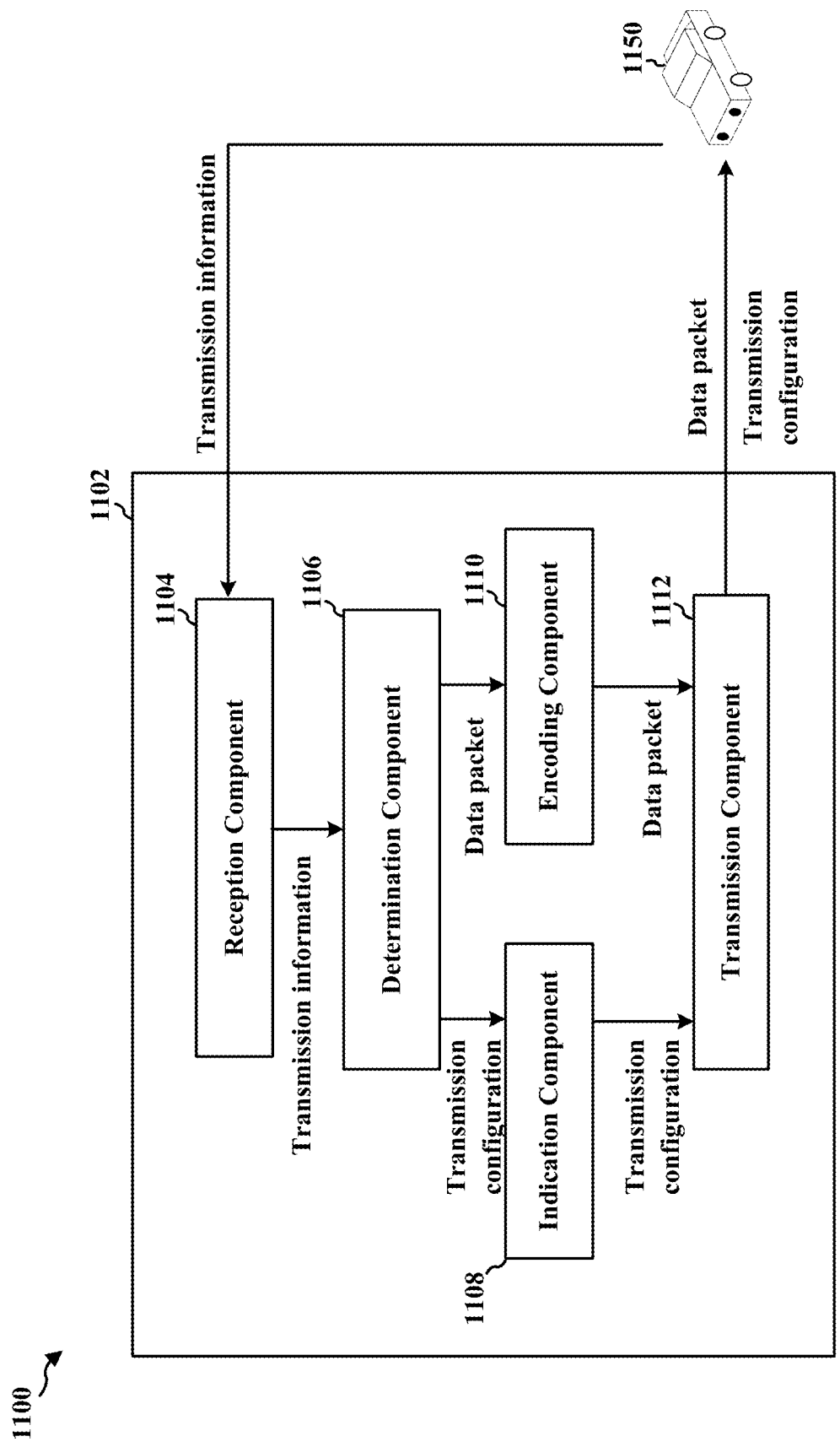
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be a UE or a component of a UE. The apparatus may also correspond to a transmitting device, e.g., device 310, 350, 402, 404, 406, 408, 902. The apparatus can include a reception component 1104 that is configured to receive transmission information from other devices or UEs 1150. The apparatus can also include a determination component 1106 that is configured to determine a transmission configuration including one or more aggregated transmission intervals for communicating with other devices or UEs, e.g., as described in connection with step 1002 above. The apparatus can also include an indication component 1108 that is configured to indicate a transmission configuration to at least one other device or UE, e.g., as described in connection with step 1004 above. The apparatus can also include a encoding component 1110 that is configured to encode at least one data packet based on the transmission configuration, e.g., as described in connection with step 1006 above. The apparatus can also include a transmission component 1112 that is configured to transmit the at least one data packet to the at least one other device or UE based on the transmission configuration, e.g., as described in connection with step 1008 above.

The apparatus may include additional components that perform each of the blocks of the algorithm in the aforementioned flowcharts of FIGS. 9 and 10. As such, each block in the aforementioned flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
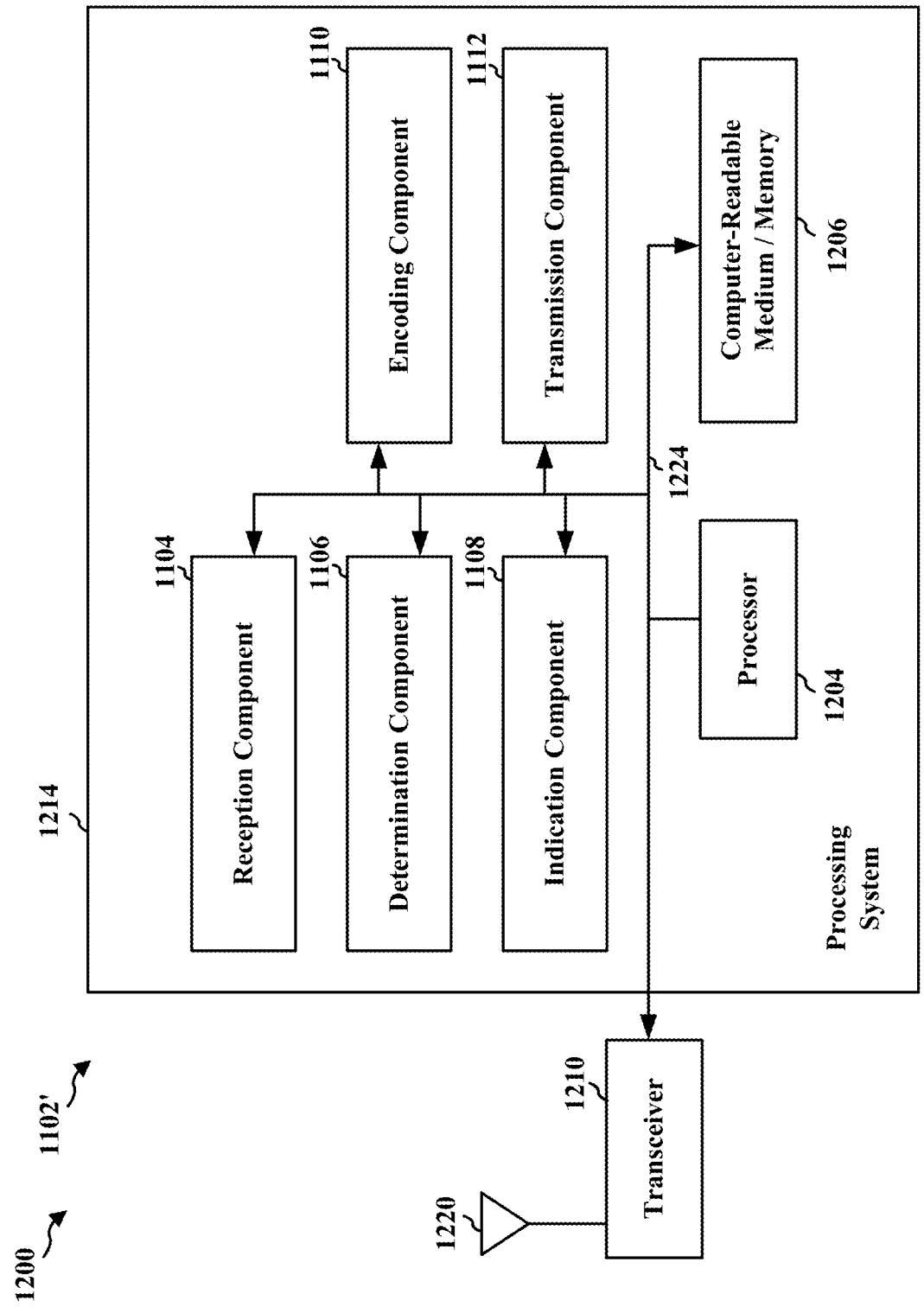
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1112, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359.

In one configuration, the apparatus 1102/1102' for wireless communication can include means for determining a transmission configuration including one or more aggregated transmission intervals for communicating with at least one receiving device. The apparatus can also include means for indicating the transmission configuration to the at least one receiving device. The apparatus can also include means for transmitting at least one data packet to the at least one receiving device based on the transmission configuration. Additionally, the apparatus can include means for encoding the at least one data packet based on the transmission configuration. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
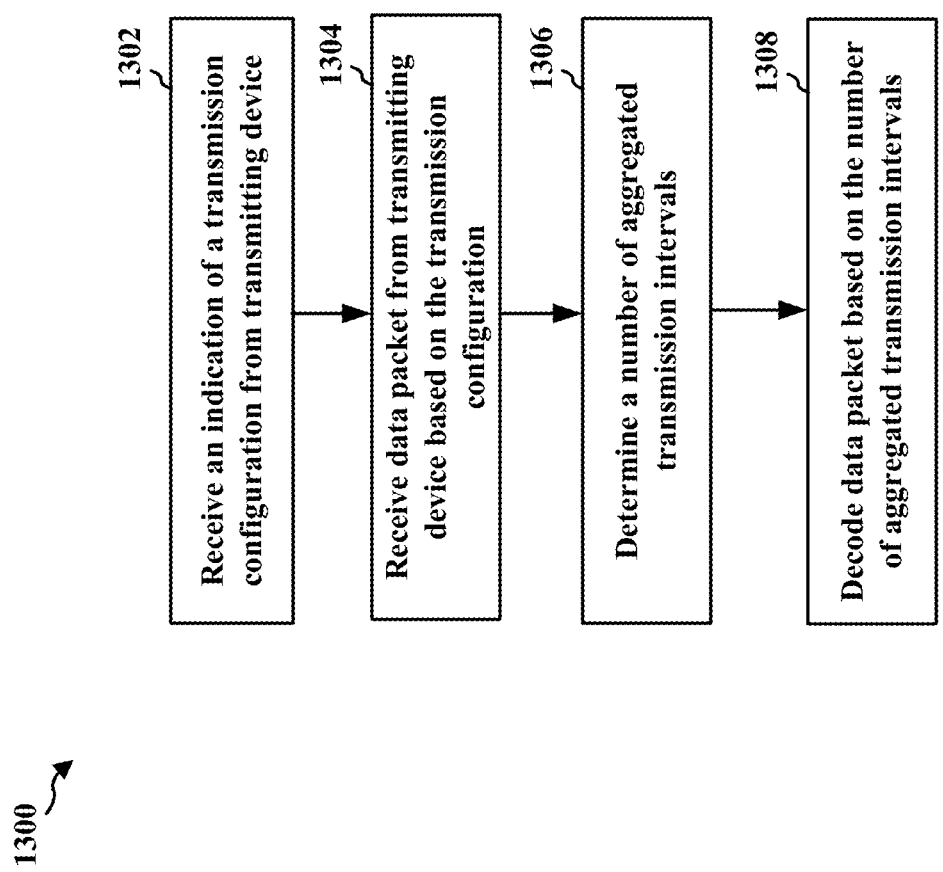
FIG. 13 is a flowchart of a method of wireless communication.

FIG. 13 is a flowchart 1300 of a method of wireless communication. The method may be performed by a device, UE, or component of a UE (e.g., UEs 104, 404, 406, 408, 410, 904, apparatus 1402; processing system 1514, which may include the memory 360 and which may be the entire UE or a component of the UE, such as the TX processor 368, the RX processor 356, and/or the controller/processor 359) communicating with a device or UE (e.g., UE 104, 350, 402, 902, apparatus 1102). Optional aspects are illustrated with a dashed line. As mentioned in connection with the example of FIG. 4, the device or UE can comprise a vehicle and/or a roadside unit. As further mentioned in connection with FIG. 4, the vehicles and/or a roadside units (e.g., the device or UE) can be engaged in V2X/V2V/D2D communication. The methods described herein can provide a number of benefits, such as improving communication signaling, resource utilization, and/or power savings.

At 1302, the device can receive an indication of a transmission configuration including one or more aggregated transmission intervals from a transmitting device, as described in connection with the examples in FIGS. 6 and 7. For example, reception component 1404 of apparatus 1402 may receive an indication of a transmission configuration including one or more aggregated transmission intervals from a transmitting device. The one or more aggregated transmission intervals can comprise one or more aggregated slots or one or more aggregated mini-slots, or any other appropriate interval. The transmission configuration can indicate a number of the one or more aggregated transmission intervals, as described in connection with the examples in FIGS. 6 and 7. In some aspects, the transmission configuration may indicate the number of aggregated transmission intervals using a DMRS sequence. Additionally, the DMRS sequence can include a cyclic shift, as described in connection with the examples in FIGS. 6 and 7. The cyclic shift can also comprise a cyclic shift value based on a length of the DMRS sequence. Moreover, the cyclic shift value can correspond to the number of aggregated transmission intervals, as described in connection with the examples in FIGS. 6 and 7.

In some aspects, the transmission configuration can comprise at least one MCS, as described in connection with the examples in FIGS. 6 and 7. Additionally, the length of the DMRS sequence can be based on the at least one MCS. In other aspects, the number of aggregated transmission intervals may be indicated using a control channel, as described in connection with the examples in FIGS. 6 and 7.

At 1304, the device can receive the at least one data packet from the transmitting device based on the transmission configuration, as described in connection with the examples in FIGS. 6 and 7. For example, reception component 1404 of apparatus 1402 may receive the at least one data packet from the transmitting device based on the transmission configuration. The number of aggregated transmission intervals may be based on a size of the at least one data packet, as described in connection with the examples in FIGS. 6 and 7. At 1306, the device can determine a number of aggregated transmission intervals in the one or more aggregated transmission intervals based on the indication, as also described in connection with the examples in FIGS. 6 and 7. For example, determination component 1406 of apparatus 1402 may determine a number of aggregated transmission intervals in the one or more aggregated transmission intervals based on the indication. The device can determine the number of aggregated transmission intervals based on the cyclic shift. At 1308, the device can decode the at least one data packet based on the number of aggregated transmission intervals, as described in connection with the examples in FIGS. 6 and 7. For example, decoding component 1408 of apparatus 1402 may decode the at least one data packet based on the number of aggregated transmission intervals. The at least one data packet can be decoded based on the cyclic shift, as described in connection with the examples in FIGS. 6 and 7. Moreover, the at least one data packet can also be decoded based on the control channel, as described in connection with the examples in FIGS. 6 and 7.

Figure 14:
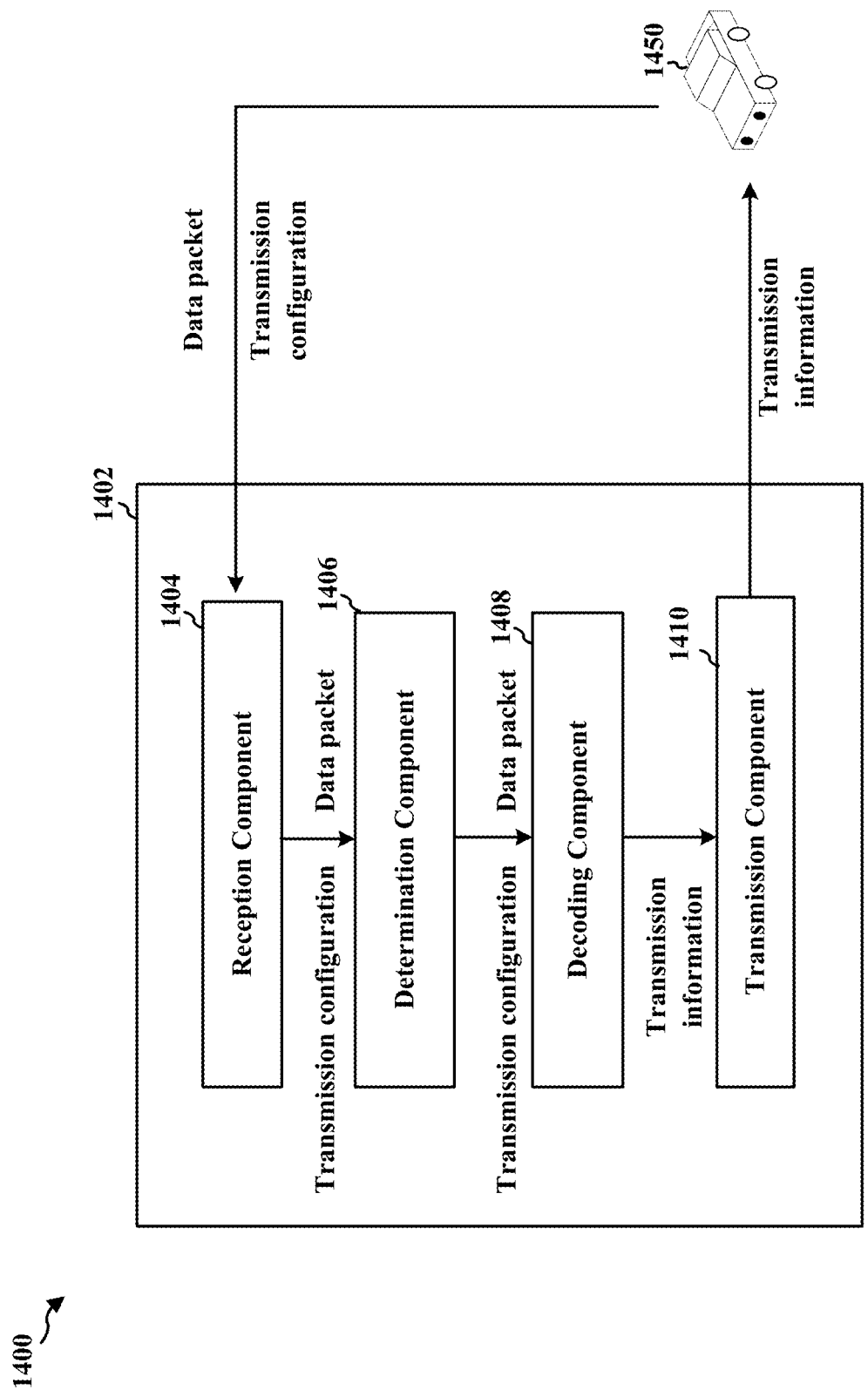
FIG. 14 is a conceptual data flow diagram illustrating the data flow between different means/components in an example apparatus.

FIG. 14 is a conceptual data flow diagram 1400 illustrating the data flow between different means/components in an example apparatus 1402. The apparatus may be a UE, e.g., UE 104, or a component of a UE. The apparatus may also correspond to a receiving device, e.g., device 310, 350, 402, 404, 406, 408, 904. The apparatus can include a reception component 1404 that is configured to receive an indication of a transmission configuration including one or more aggregated transmission intervals from a transmitting device, e.g., as described in connection with step 1302 above. The reception component 1404 can also be configured to receive at least one data packet from the transmitting device based on the transmission configuration, e.g., as described in connection with step 1304 above. The apparatus can also include a determination component 1406 that is configured to determine a number of aggregated transmission intervals in the one or more aggregated transmission intervals based on the indication, e.g., as described in connection with step 1306 above. The apparatus can include a decoding component 1408 that is configured to decode the at least one data packet based on the number of aggregated transmission intervals, e.g., as described in connection with step 1308 above. The apparatus can include a transmission component 1410 that is configured to transmit transmission information to other devices or UEs 1450.

The apparatus may include additional components that perform each of the blocks of the algorithm in the aforementioned flowcharts of FIGS. 9 and 13. As such, each block in the aforementioned flowcharts of FIGS. 9 and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
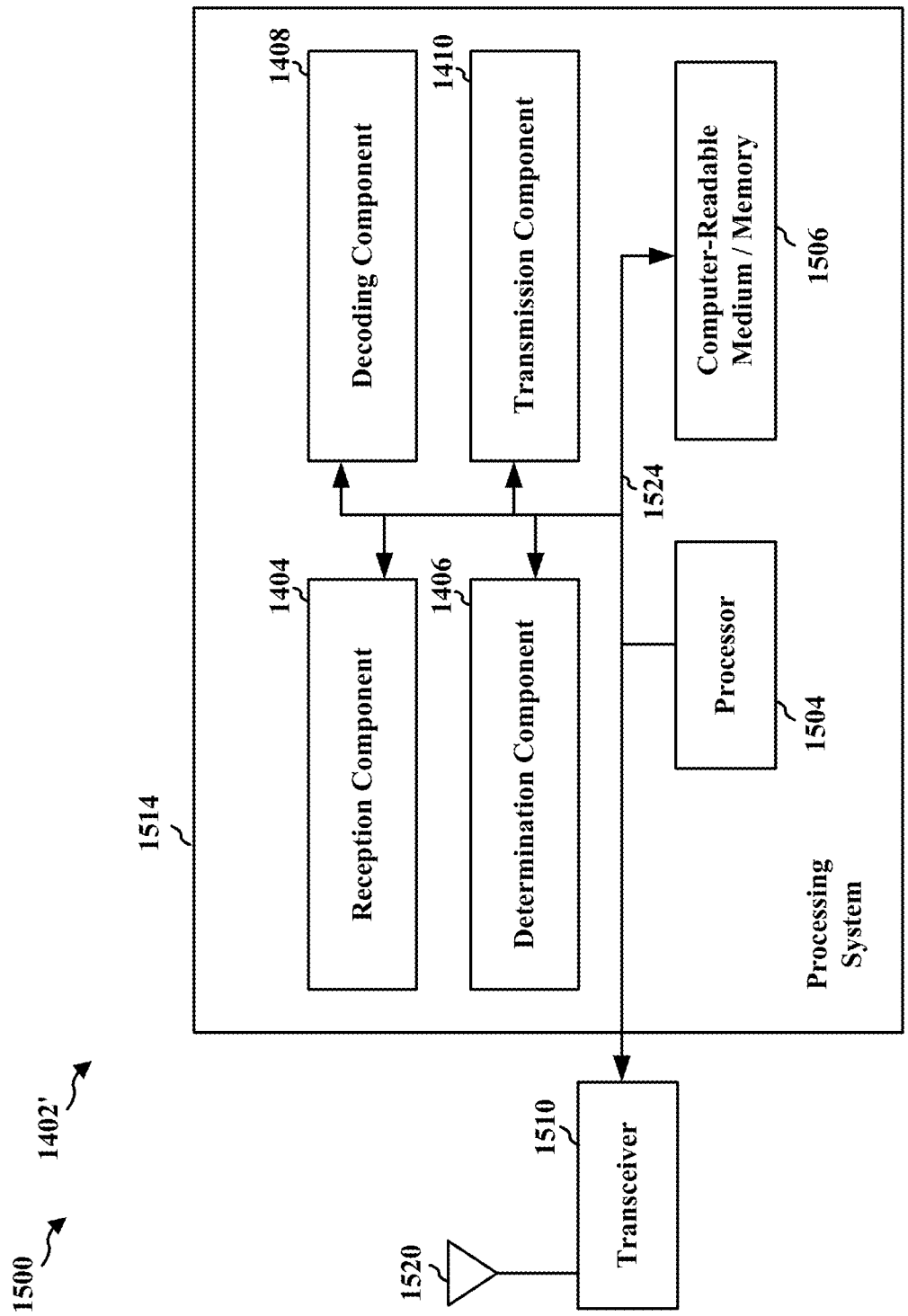
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1410, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410. The components may be software components running in the processor 1504, resident/stored in the computer readable medium/memory 1506, one or more hardware components coupled to the processor 1504, or some combination thereof. The processing system 1514 may be a component of the UE 350 and may include the memory 360 and/or at least one of the TX processor 368, the RX processor 356, and the controller/processor 359.

In one configuration, the apparatus 1402/1402' for wireless communication can include means for receiving an indication of a transmission configuration including one or more aggregated transmission intervals from a transmitting device. The apparatus can also include means for receiving at least one data packet from the transmitting device based on the transmission configuration. Additionally, the apparatus can include means for determining a number of aggregated transmission intervals in the one or more aggregated transmission intervals based on the indication. The apparatus can also include means for decoding the at least one data packet based on the number of aggregated transmission intervals. The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a transmitting device, comprising:
    determining a transmission configuration including one or more aggregated transmission intervals for communicating with at least one receiving device;
    indicating the transmission configuration to the at least one receiving device; and
    transmitting at least one data packet to the at least one receiving device based on the transmission configuration;
    wherein the transmission configuration indicates a number of the one or more aggregated transmission intervals using a de-modulation reference signal (DMRS) sequence.

2. The method of claim 1, wherein the one or more aggregated transmission intervals comprise one or more aggregated slots or one or more aggregated mini-slots.

3. The method of claim 1, wherein the DMRS sequence includes a cyclic shift.

4. The method of claim 3, wherein the at least one data packet is encoded based on the number of the one or more aggregated transmission intervals indicated by the cyclic shift.

5. The method of claim 3, wherein the cyclic shift comprises a cyclic shift value based on a length of the DMRS sequence.

6. The method of claim 5, wherein the cyclic shift value corresponds to the number of the one or more aggregated transmission intervals.

7. The method of claim 1, wherein the number of the one or more aggregated transmission intervals is indicated using a control channel.

8. The method of claim 7, wherein the at least one data packet is encoded based on the control channel.

9. The method of claim 1, wherein the number of the one or more aggregated transmission intervals is based on a size of the at least one data packet.

10. The method of claim 1, further comprising:
    encoding the at least one data packet based on the transmission configuration.

11. The method of claim 1, wherein determining the transmission configuration further comprises:
    aggregating the one or more aggregated transmission intervals for communicating with the at least one receiving device.

12. An apparatus for wireless communication at a transmitting device, comprising:
    a memory; and
    at least one processor coupled to the memory and configured to:
        determine a transmission configuration including one or more aggregated transmission intervals for communicating with at least one receiving device;
        indicate the transmission configuration to the at least one receiving device; and
        transmit at least one data packet to the at least one receiving device based on the transmission configuration;
        wherein the transmission configuration indicates a number of the one or more aggregated transmission intervals using a de-modulation reference signal (DMRS) sequence.

13. The apparatus of claim 12, wherein the one or more aggregated transmission intervals comprise one or more aggregated slots or one or more aggregated mini-slots.

14. The apparatus of claim 12, wherein the DMRS sequence includes a cyclic shift, wherein the at least one data packet is encoded based on the number of the one or more aggregated transmission intervals indicated by the cyclic shift.

15. The apparatus of claim 12, wherein the at least one processor is further configured to:
    encode the at least one data packet based on the transmission configuration.

16. A method of wireless communication by a receiving device, comprising:
    receiving an indication of a transmission configuration including one or more aggregated transmission intervals from a transmitting device;
    receiving at least one data packet from the transmitting device based on the transmission configuration;
    determining a number of aggregated transmission intervals in the one or more aggregated transmission intervals based on the indication, wherein the number of aggregated transmission intervals are indicated using a de-modulation reference signal (DMRS) sequence; and
    decoding the at least one data packet based on the number of aggregated transmission intervals.

17. The method of claim 16, wherein the one or more aggregated transmission intervals comprise one or more aggregated slots or one or more aggregated mini-slots.

18. The method of claim 16, wherein the DMRS sequence includes a cyclic shift, wherein the receiving device determines the number of aggregated transmission intervals based on the cyclic shift.

19. The method of claim 18, wherein the at least one data packet is decoded based on the number of aggregated transmission intervals indicated by the cyclic shift.

20. The method of claim 18, wherein the cyclic shift comprises a cyclic shift value based on a length of the DMRS sequence.

21. The method of claim 20, wherein the cyclic shift value corresponds to the number of aggregated transmission intervals.

22. The method of claim 16, wherein the number of aggregated transmission intervals are indicated using a control channel.

23. The method of claim 22, wherein the at least one data packet is decoded based on the control channel.

24. The method of claim 16, wherein the number of aggregated transmission intervals is based on a size of the at least one data packet.

25. An apparatus for wireless communication at a receiving device, comprising:
    a memory; and
    at least one processor coupled to the memory and configured to:

receive an indication of a transmission configuration including one or more aggregated transmission intervals from a transmitting device;

receive at least one data packet from the transmitting device based on the transmission configuration;

determine a number of aggregated transmission intervals in the one or more aggregated transmission intervals based on the indication, wherein the number of aggregated transmission intervals are indicated using a de-modulation reference signal (DMRS) sequence; and decode the at least one data packet based on the number of aggregated transmission intervals.

26. The apparatus of claim 25, wherein the one or more aggregated transmission intervals comprise one or more aggregated slots or one or more aggregated mini-slots.

27. The apparatus of claim 25, wherein the DMRS sequence includes a cyclic shift, wherein the receiving device determines the number of aggregated transmission intervals based on the cyclic shift, wherein the at least one data packet is decoded based on the number of aggregated transmission intervals indicated by the cyclic shift.

28. The apparatus of claim 25, wherein the number of aggregated transmission intervals are indicated using a control channel, wherein the at least one data packet is decoded based on the control channel.

* * * * *